US011697137B2

(12) United States Patent
Dancs et al.

(10) Patent No.: US 11,697,137 B2
(45) Date of Patent: Jul. 11, 2023

(54) MOBILE SURFACE MAINTENANCE MACHINE WITH AN ONBOARD PRESSURE WASHER

(71) Applicant: Tennant Company, Minneapolis, MN (US)

(72) Inventors: Justin I. Dancs, Eden Prairie, MN (US); Matthew W. Servatius, New Brighton, MN (US)

(73) Assignee: Tennant Company, Eden Prairie, MN (US)

( * ) Notice: Subject to any disclaimer, the term of this patent is extended or adjusted under 35 U.S.C. 154(b) by 527 days.

(21) Appl. No.: 16/823,281

(22) Filed: Mar. 18, 2020

(65) Prior Publication Data
US 2020/0298287 A1    Sep. 24, 2020

Related U.S. Application Data

(60) Provisional application No. 62/822,811, filed on Mar. 23, 2019.

(51) Int. Cl.
*B08B 3/02* (2006.01)
*H02K 11/25* (2016.01)
(Continued)

(52) U.S. Cl.
CPC .............. *B08B 3/026* (2013.01); *B08B 13/00* (2013.01); *B60L 1/003* (2013.01); *B60L 3/12* (2013.01);
(Continued)

(58) Field of Classification Search
CPC . B08B 3/026; B08B 13/00; B08B 2203/0223; B08B 2203/027; H02K 11/25;
(Continued)

(56) References Cited

U.S. PATENT DOCUMENTS 3,687,156 A    8/1972    Minich, Jr. et al.
5,500,976 A    3/1996    Rohrbacher et al.
(Continued)

FOREIGN PATENT DOCUMENTS

CN    104762909 A    7/2015
EP    3431665 A1    1/2019
WO    0140726 A1    6/2001

OTHER PUBLICATIONS

WO2018108237A1—machine translation (Year: 2018).*
(Continued)

*Primary Examiner* — Tinsae B Ayalew
(74) *Attorney, Agent, or Firm* — Fredrikson & Byron, P.A.

(57) ABSTRACT

A mobile surface maintenance machine embodiment includes a mobile body, a solution tank for containing a cleaning fluid, wheels for supporting the mobile body, a maintenance tool(s), an output channel, an electric power source, a first electric motor, and a pressure washer. The pressure washer includes a spray wand, a pressure pump, and a second electric motor. The pressure pump is fluidly coupled to the spray wand and to the solution tank. The pressure pump is configured to pressurize the cleaning fluid supplied to the spray wand. The second electric motor is operatively coupled to and configured to drive the pressure pump. The second electric motor is configured to receive electric power from the electric power source and is commonly powered by the electric power source that provides power to the first electric motor. The second electric motor is separate from the first electric motor.

17 Claims, 10 Drawing Sheets

(51) Int. Cl.
  *B60L 50/60* (2019.01)
  *B08B 13/00* (2006.01)
  *B60L 1/00* (2006.01)
  *B60L 3/12* (2006.01)
  *E01H 1/10* (2006.01)
  *H02K 5/10* (2006.01)
  *H02P 5/68* (2006.01)
  *H02K 5/20* (2006.01)
  *A47L 7/00* (2006.01)
  *A47L 11/10* (2006.01)
  *A47L 11/24* (2006.01)
  *A47L 11/28* (2006.01)
  *A47L 11/29* (2006.01)

(52) U.S. Cl.
  CPC .............. *B60L 50/60* (2019.02); *E01H 1/101* (2013.01); *H02K 5/10* (2013.01); *H02K 5/203* (2021.01); *H02K 11/25* (2016.01); *H02P 5/68* (2013.01); *A47L 7/0004* (2013.01); *A47L 11/10* (2013.01); *A47L 11/24* (2013.01); *A47L 11/28* (2013.01); *A47L 11/29* (2013.01); *B08B 2203/027* (2013.01); *B08B 2203/0223* (2013.01); *B60L 2200/40* (2013.01); *B60L 2220/20* (2013.01); *E01H 1/103* (2013.01)

(58) Field of Classification Search
  CPC .......... H02K 5/203; H02K 5/10; B60L 50/60; B60L 3/12; B60L 2200/40; B60L 2200/20; E01H 1/101; E01H 1/103; H02P 5/68; A47L 7/0004; A47L 11/10; A47L 11/24; A47L 11/28; A47L 11/29
  USPC .......................................................... 134/58
  See application file for complete search history.

(56) References Cited

U.S. PATENT DOCUMENTS

| | | |
|---|---|---|
| 5,538,402 A | 7/1996 | McKenney |
| 2005/0189437 A1 | 9/2005 | Alexander et al. |
| 2006/0027253 A1 | 2/2006 | Kaiser |
| 2014/0119949 A1* | 5/2014 | Wischstadt ............. F04B 17/05 417/34 |
| 2016/0082931 A1* | 3/2016 | Qian ........................ B05B 9/01 134/57 R |

OTHER PUBLICATIONS

English Abstract and Machine Translation for Chinese Publication No. CN104762909A, published Jul. 8, 2015, 6 pgs.

International Patent Application No. PCT/US2020/023453, International Search Report and Written Opinion dated Jul. 9, 2020, 17 pages.

* cited by examiner

MOBILE SURFACE MAINTENANCE MACHINE WITH AN ONBOARD PRESSURE WASHER

RELATED MATTER

This application claims the benefit of U.S. Provisional Patent Application No. 62/822,811, filed Mar. 23, 2019, the contents of which are incorporated herein by reference.

TECHNICAL FIELD

The present application discloses embodiments of pressure washers and, in particular, embodiments of surface maintenance machines with pressure washers.

BACKGROUND

Surface maintenance machines can perform maintenance tasks such as sweeping, scrubbing, and polishing (burnishing) a surface. The number of maintenance tasks that a surface maintenance machine is capable of performing can increase the number of components and power consumption requirements of the surface maintenance machine. Thus, while it can be advantageous to have a surface maintenance machine that can perform a variety of maintenance tasks, current surface maintenance machines may be confined in the number of maintenance tasks capable of being performed due to weight and efficiency constraints associated with enabling such tasks.

SUMMARY

Embodiments disclosed herein can provide a pressure washer that efficiently utilizes resources available at a surface maintenance machine. Such embodiments can allow a mobile surface maintenance machine to incorporate such a pressure washer while maintaining weight, power, size, and other efficiency considerations for the surface maintenance machine.

One embodiment includes a mobile surface maintenance machine. This mobile surface maintenance machine embodiment includes a mobile body, a solution tank for containing a supply of a cleaning fluid, wheels for supporting and transporting the mobile body, one or more surface maintenance tools at the mobile body, an output channel, an electric power source, a first electric motor, and a pressure washer. The output channel is fluidly connected to the solution tank. The output channel provides a fluid channel to carry cleaning fluid from the solution tank to a surface on which the one or more surface maintenance tools perform surface maintenance. The electric power source is at the mobile body and includes one or more batteries. The first electric motor is powered by the electric power source. The first electric motor is configured to actuate the one or more surface maintenance tools. The pressure washer includes a spray wand, a pressure pump, and a second electric motor. The spray wand terminates in a nozzle to dispense the cleaning fluid therethrough. The pressure pump is fluidly coupled to the spray wand and to the solution tank. The pressure pump is positioned upstream of the spray wand to supply the cleaning fluid from the solution tank to the spray wand. The pressure pump is configured to pressurize the cleaning fluid supplied to the spray wand. The second electric motor is operatively coupled to and configured to drive the pressure pump. The second electric motor is configured to receive electric power from the electric power source and is commonly powered by the electric power source that provides power to the first electric motor. The second electric motor is separate from the first electric motor.

In a further embodiment of this mobile surface maintenance machine, the first electric motor can be one or more electric motors, and the one or more electric motors can be configured to generate torque to rotate the wheels of the surface maintenance machine.

In a further embodiment of this mobile surface maintenance machine, the pressure pump can be coupled to the solution tank via a feed pump or via a gravity feed arrangement.

In a further embodiment of this mobile surface maintenance machine, the mobile surface maintenance machine can include a motor controller in operative communication with the electric power source and the second electric motor. In one such embodiment, the motor controller can be configured to convert a DC input signal from the electric power source and convert the DC signal to a DC output signal and supply the DC output signal to the second electric motor. In such embodiment, the motor controller can be configured to convert the DC input signal from the electric power source to the DC output signal without converting the DC input signal to an AC signal.

In a further embodiment of this mobile surface maintenance machine, the second electric motor can be a totally enclosed non-ventilated type electric motor.

In a further embodiment of this mobile surface maintenance machine, the second electric motor can include a motor housing. The motor housing can be liquid-proof to restrict ingress of liquid into the second electric motor.

In a further embodiment of this mobile surface maintenance machine, the pressure pump can be configured to pressurize the cleaning fluid to a pressure of at least 1000 psi. For example, the pressure pump can be configured to pressurize the cleaning fluid to a pressure of at least 1000 psi and to enable a cleaning fluid output from the spray wand at a flow rate of two gallons per minute. In another embodiment, the pressure pump can be configured to pressurize the cleaning fluid to a pressure of at least 2000 psi. For example, the pressure pump is configured to pressure the cleaning fluid to a pressure of at least 2000 psi and to enable a cleaning fluid output from the spray wand at a flow rate of two gallons per minute.

An additional embodiment includes a pressure washer coupled to a mobile surface maintenance machine. This pressure washer embodiment includes a spray wand, a pressure pump, a feed pump, an electric motor, and a motor controller. The spray wand terminates in a nozzle to dispense a cleaning fluid therethrough. The pressure pump is fluidly coupled to the spray wand and positioned upstream of the spray wand to supply the cleaning fluid to the spray wand. The feed pump is positioned within the mobile surface maintenance machine. The feed pump is fluidly coupled to and located upstream of the pressure pump. The pressure pump receives the cleaning fluid from the feed pump at a first pressure and pressurizes the received cleaning fluid to a second pressure that is greater than the first pressure. The electric motor is operatively coupled to and configured to drive the pressure pump. The electric motor is configured to receive electric power from an electric power source positioned within the mobile surface maintenance machine. The motor controller is in operative communication with each of the electric motor and the pressure pump. The motor controller is operatively coupled with the pressure pump, and the motor controller receives signals indicative of one or more operating conditions of the surface maintenance machine and indicative of one or more operation conditions of the electric motor or the pressure pump. The motor controller is configured to receive current from the electric power source and supply or stop supplying current to initiate or stop, respectively, operation of the electric motor based on the one or more operating conditions of the surface maintenance machine and the one or more operating conditions of the electric motor or the pressure pump. The supplying of current to initiate operation of the electric motor to drive the pressure pump is configured to provide cleaning fluid to the spray wand at the second pressure.

In a further embodiment of this pressure washer, the pressure pump and the electric motor are each mounted on a single drive shaft, such that the pressure pump is directly coupled to the electric motor.

In a further embodiment of this pressure washer, the motor controller is configured to supply current to the electric motor when at least one of the following conditions are satisfied: if onboard sensors indicate that the mobile surface maintenance machine has the cleaning fluid in a solution tank, if the pressure pump is receiving the cleaning fluid from the feed pump, and if the pressure pump is operational.

In a further embodiment of this pressure washer, the motor controller is configured to stop supplying current to the electric motor when at least one of the following conditions are satisfied: if onboard sensors indicate that the mobile surface maintenance machine is being propelled, if the solution tank is empty, if the electric motor is overheating, and if the mobile surface maintenance machine has been stopped in an emergency.

In a further embodiment of this pressure washer, the motor controller is housed at a housing, and the housing is configured to dissipate heat from surfaces of the motor controller. In one such embodiment, the housing of the motor controller is in fluid communication with the feed pump and is positioned downstream thereof, such that the cleaning fluid from the feed pump passes through the housing of the motor controller, thereby cooling the motor controller.

In a further embodiment of this pressure washer, the electric power source includes one or more batteries, and the motor controller is electrically coupled to the one or more batteries.

Another pressure washer embodiment is coupled to a mobile surface maintenance machine. This pressure washer embodiment includes a spray wand, a pressure pump, an electric motor, and a motor controller. The spray wand terminates in a nozzle to dispense a cleaning fluid therethrough. The pressure pump is fluidly coupled to the spray wand and positioned upstream of the spray wand to supply the cleaning fluid received from a fluid source from within the mobile surface maintenance machine. The electric motor is operatively coupled to the pressure pump and configured to drive the pressure pump. The electric motor is configured to receive electric power from an electric power source positioned within the mobile surface maintenance machine. The motor controller is in operative communication with each of the electric power source, the electric motor and the pressure pump, and the motor controller is operatively coupled with the pressure pump. The motor controller is configured to: receive signals from the mobile surface maintenance machine indicative of one or more operating conditions of the mobile surface maintenance machine, receive signals indicative of one or more operating conditions of the electric motor and the pressure pump respectively, determine whether the one or more operating conditions of the mobile surface maintenance machine indicate that the one or more operating conditions of the mobile surface maintenance machine are configured to permit operation of the pressure washer, determine whether one or more operating conditions of the electric motor and the pressure pump indicate that the one or more operating conditions of the electric motor and the pressure pump are configured to permit operation of the pressure washer, and send an output signal to the electric motor. Upon receipt of the output signal from the motor controller, the electric motor receives electric power from the electric power source and drives the pressure pump.

In a further embodiment of this pressure washer, the fluid source is a solution tank, and the pressure pump is fluidly coupled to the solution tank and a feed pump. Each of the solution tank and the feed pump can be positioned within the mobile surface maintenance machine.

In a further embodiment of this pressure washer, the motor controller is operatively coupled to a pressure switch positioned upstream of the pressure pump. The motor controller is configured to receive a first electrical signal from the pressure switch indicative of fluid being received by the pressure pump from the fluid tank and via the feed pump. In one such example, the motor controller is configured to send the output signal including a second electrical signal to the electric motor if the motor controller determines that the first electrical signal received from the pressure switch indicates that the fluid is received by pressure pump from the fluid tank via the feed pump. Upon receipt of the second electrical signal, the electric motor receives electric power from the electric power source and drives the pressure pump.

In a further embodiment of this pressure washer, the motor controller is operatively coupled to a temperature sensor operatively coupled to the electric motor. The motor controller is configured to receive a third electrical signal from the temperature sensor indicative of the temperature of the electric motor to determine if the electric motor is overheating. In one such example, the motor controller is configured to send the output signal including a fourth electrical signal to the electric motor if the motor controller determines that the first electrical signal received from the pressure switch indicates that the fluid is received by pressure pump from the solution tank via the feed pump. Upon receipt of the fourth electrical signal, the electric motor stops receiving electric power from the electric power source and thereby stops driving the pressure pump. In a further example, the motor controller is operatively coupled to a temperature sensor operatively coupled to the electric motor. Here, the motor controller is configured to receive a third electrical signal from the temperature sensor indicative of the temperature of the electric motor to determine if the electric motor is overheating.

In a further embodiment of this pressure washer, the motor controller is configured to send the output signal comprising a fourth electrical signal to the electric motor if the motor controller determines that the second electrical signal received from the temperature sensor indicates that the electric motor is overheating.

In a further embodiment of this pressure washer, the motor controller is in operative communication with one or more onboard sensors of the mobile surface maintenance machine, to receive electrical signals indicative of at least one of the following: whether the mobile surface maintenance machine is propelling, if the fluid source is empty, if the mobile surface maintenance machine has a pressure washer, and if the mobile surface maintenance machine has been stopped in an emergency stop.

In a further embodiment of this pressure washer, the motor controller is configured to send a fifth electrical signal to the electric motor if the motor controller determines that: the pressure pump is receiving the cleaning fluid, the motor temperature is less than preset temperature maximum, or the pressure pump is operational.

Another embodiment includes a mobile surface maintenance machine. In this embodiment, the mobile surface maintenance includes a body, wheels for supporting the body for movement over a surface, a fluid source, an electric power source positioned at (e.g., within) the body, a fluid source positioned at (e.g., within) the body, a feed pump, and a pressure washer. The feed pump is in fluid communication with and positioned downstream of the fluid source, and the feed pump is configured to pressurize the fluid in the fluid source to a first pressure. The pressure washer is positioned on an exterior of the body. The pressure washer includes a spray wand terminating in a nozzle to dispense a cleaning fluid therethrough, a pressure pump, an electric motor, and a motor controller. The pressure pump is fluidly coupled to the spray wand and positioned upstream of the spray wand to supply the cleaning fluid to the spray wand. The pressure pump is fluidly coupled to and located downstream of the feed pump, and the pressure pump configured to pressurize fluid received from the feed pump to a second pressure that is greater than the first pressure. The electric motor is operatively coupled to and configured to drive the pressure pump. The electric motor is configured to receive electric power from, and positioned within, the mobile surface maintenance machine. The motor controller is in operative communication with each of the electric motor and the pressure pump, and the motor controller is operatively coupled with the pressure pump. The motor controller is configured to receive current from the electric power source and supply or stop supplying current to initiate or stop, respectively, operation of the electric motor based on one or more operating conditions of the surface maintenance machine and one or more operating conditions of the electric motor and the pressure pump.

In a further embodiment of this mobile surface maintenance machine, an entirety of the pressure washer is positioned to the exterior of an outer surface the body.

In a further embodiment of this mobile surface maintenance machine, the pressure washer is positioned to the rear of a transverse center plane of the mobile surface maintenance machine.

The details of one or more examples are set forth in the accompanying drawings and the description below. Other features, objects, and advantages will be apparent from the description and drawings.

DETAILED DESCRIPTION

Figure 1A:
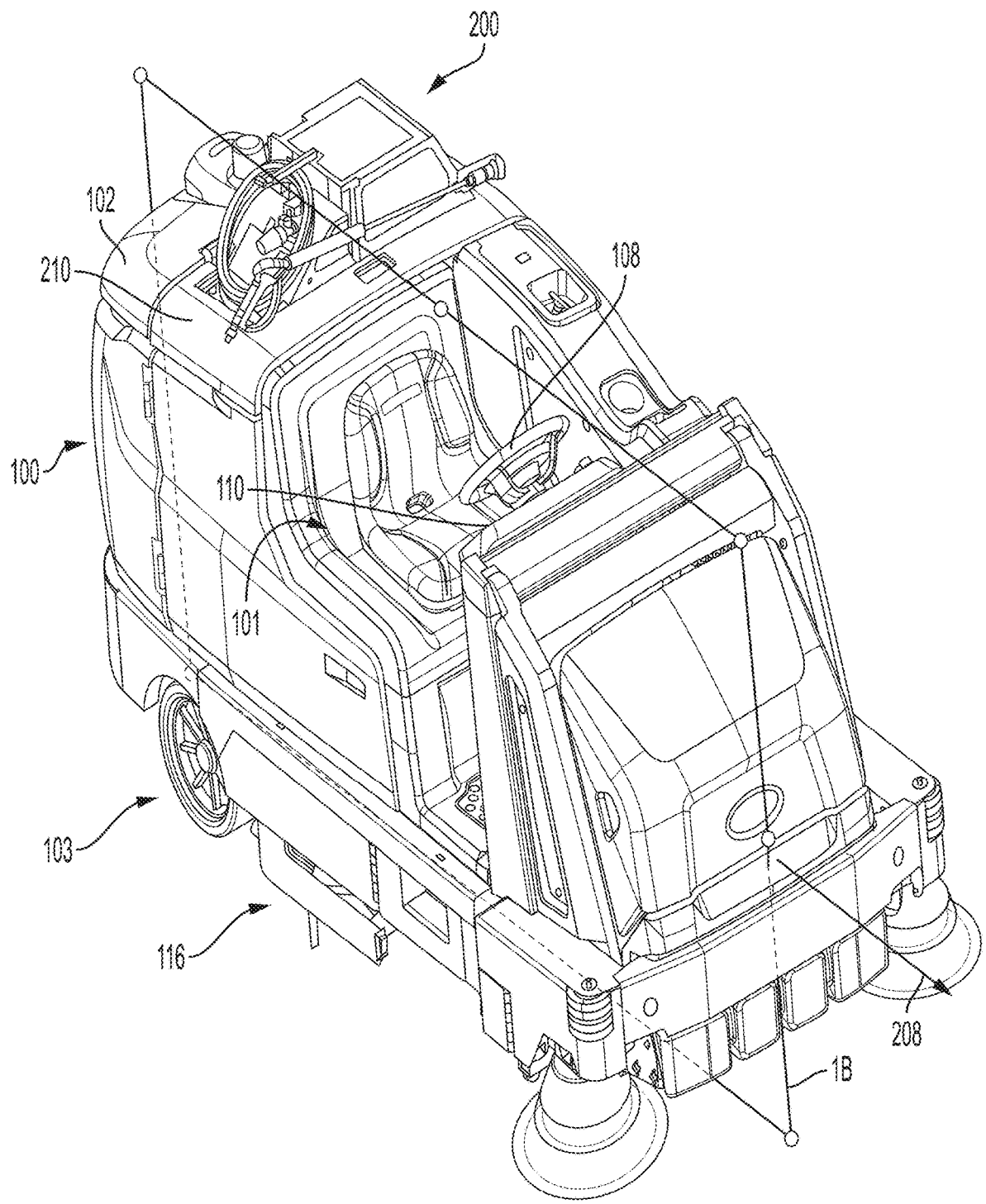
FIG. 1A is a perspective view of a mobile surface maintenance machine (vehicle) according to an embodiment of the present disclosure.
Figure 1B:
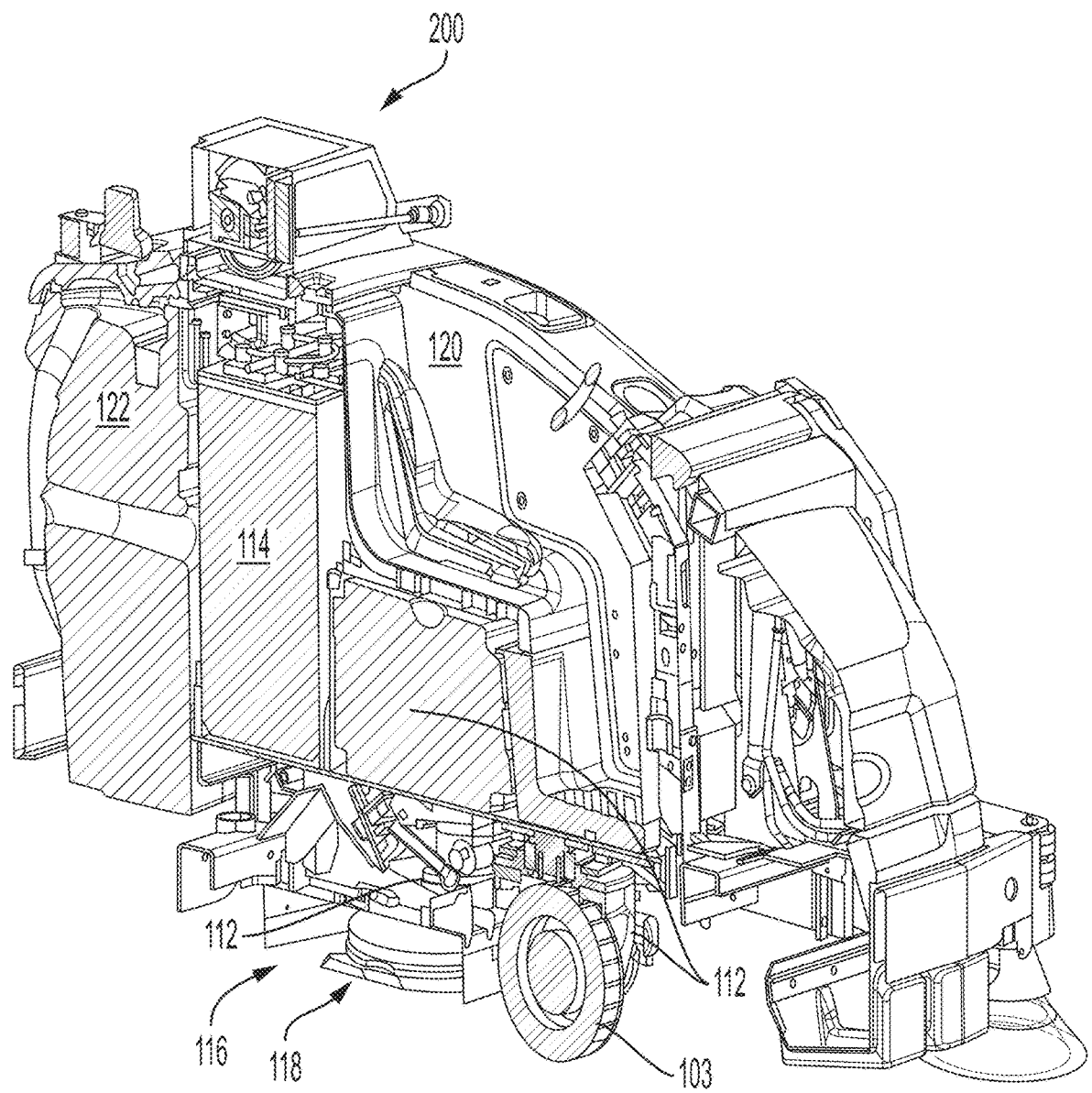
FIG. 1B is a sectional perspective view of the mobile surface maintenance machine of FIG. 1A taken along a longitudinal plane through the mobile surface maintenance machine.
Figure 1C:
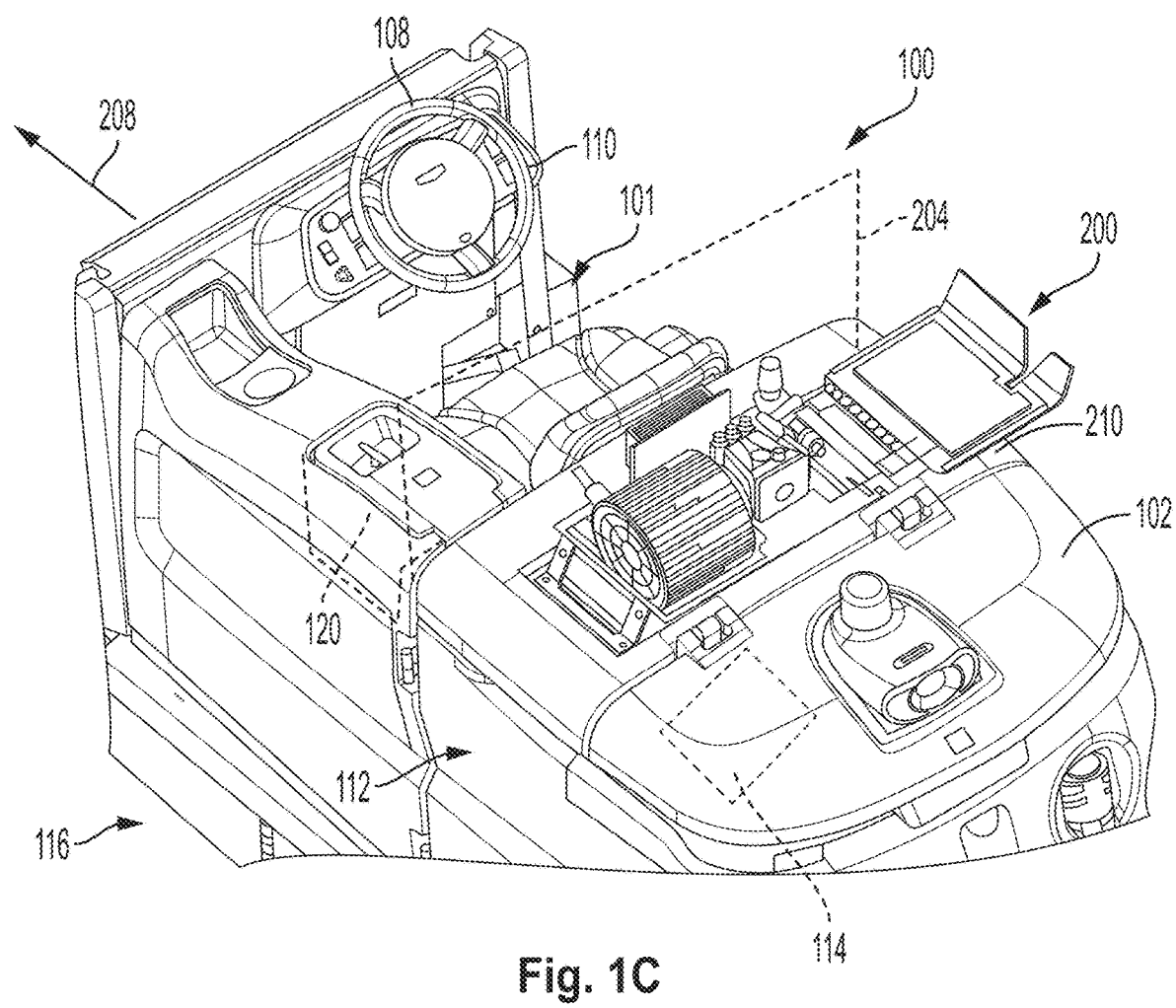
FIG. 1C is a perspective view of the mobile surface maintenance machine of FIG. 1A.

FIGS. 1A-1C are perspective views of an exemplary surface maintenance machine 100 according to an aspect of the invention. FIG. 1A is a perspective view of the surface maintenance machine. FIG. 1B is a perspective sectional view taken through the longitudinal plane 1B in FIG. 1A. FIG. 1C is a partial perspective view of the surface maintenance machine in FIG. 1A. Referring to the illustrated embodiments shown in FIGS. 1A-1C, the surface maintenance machine 100 is a ride-on machine. During use, an operator may ride the surface maintenance machine 100 in a seated position and sit in the seat in the operator cab 101. Alternatively, the machine can be a walk-behind or a tow-behind machine.

The surface maintenance machine can perform maintenance tasks such as sweeping, scrubbing, polishing (burnishing) a surface. The surface can be a floor surface, pavement, road surface and the like. Embodiments of the surface maintenance machine 100 include components that are supported on a mobile body 102. The mobile body 102 comprises a frame supported on wheels 103 for travel over a surface, on which a surface maintenance operation is to be performed. The mobile body 102 may include operator controls and a steering control such as a steering wheel 108 such that an operator can turn the steering wheel 108 and control the speed of the surface maintenance machine 100 without having to remove the operator's hands from the steering wheel 108 using means well-known in the art. Continuing with the illustrated embodiment of FIGS. 1A-1C, advantageously, controls for steering, propelling, and controlling various operations of the surface maintenance machine 100 can be provided on an operator console 110.

The surface maintenance machine 100 can be powered by batteries 114. The batteries 114 can be proximate the rear of the surface maintenance machine 100, or it may instead be located elsewhere, such as within the interior of the surface maintenance machine 100, supported within a frame, and/or proximate the front of the surface maintenance machine 100. Alternatively, the surface maintenance machine 100 can be powered by an external electrical source (e.g., a power generator) via an electrical outlet 276 or a fuel cell.

The surface maintenance machine 100 includes one or more electric motors 112 that are supported on the mobile body 102 and may be located within the interior of the surface maintenance machine 100. One or more electric motors 112 receive power from batteries 114. Electric motors 112 supply torque to the surface maintenance machine, including the torque to rotate the wheels 103 in order to propel the surface maintenance machine 100 in a selected direction. Electric motors 112 are one or more electrically powered motors where the mechanical output of the electric motors (e.g., output shaft) provides the torque.

The surface maintenance machine 100 includes a maintenance head assembly 116 (sometimes the assembly is referred to as a maintenance head). The maintenance head assembly 116 houses one or more surface maintenance tools 118 such as scrub brushes, sweeping brushes, and polishing, stripping or burnishing pads, and tools for extracting (e.g., dry or wet vacuum tools). For example, the maintenance head assembly 116 is a cleaning head comprising one or more cleaning tools (e.g., sweeping or scrubbing brushes) as surface maintenance tools 118. Alternatively, the maintenance head assembly 116 is a treatment head comprising one or more treatment tools (e.g., polishing, stripping or buffing pads). Many different types of surface maintenance tools are used to perform one or more maintenance operations on the surface. The maintenance operation can be a dry operation or a wet operation. In a wet operation, fluid, such as cleaning fluid from an on-board solution tank 120, is supplied to or proximate to the maintenance head assembly 116 where it may be sprayed onto the underlying floor surface. Such maintenance tools include sweeping, scrubbing brushes, wet scrubbing pads, polishing/burnishing and/or buffing pads. Additionally, one or more side brushes for performing sweeping, dry or wet vacuuming, extracting, scrubbing or other operations can be provided. The maintenance head assembly 116 can extend toward a surface on which a maintenance operation is to be performed. For example, the maintenance head assembly 116 can be attached to the base of the surface maintenance machine 100 such that the head can be lowered to an operating position and raised to a traveling position. The maintenance head assembly 116 can be connected to the surface maintenance machine 100 using any known mechanism, such as a suspension and lift mechanism. The torque for the maintenance head may be provided by the one or more electric motors 112. In an aspect of the invention, different ones of the one or more electric motors provide the torque to propel the machine and provide the torque to actuate components of the maintenance head assembly 116, such as the one or more surface maintenance tools.

Figure 1D:
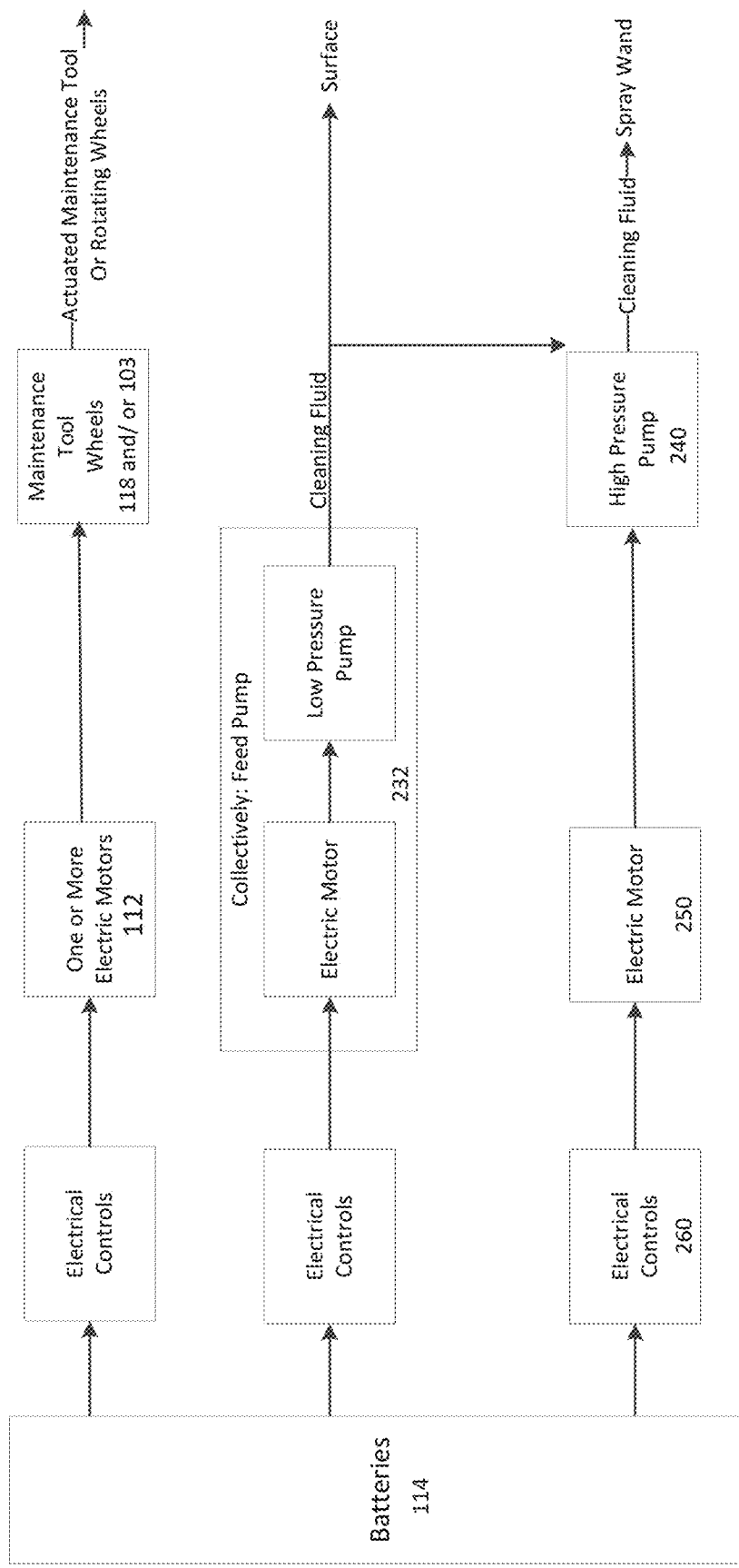
FIG. 1D is an electrical schematic of certain electrical components according to an embodiment of the present disclosure.

Referring to FIG. 1D, an embodiment of a basic electrical schematic of portions of the surface maintenance machine 100 is shown. As shown, one or more electric motors 112 receive power from batteries 114, which are batteries in FIG. 1D. Power may be controlled or regulated via suitable electrical controls, some of which are described herein. Electric motors 112 are operatively connected to one or more of the wheels 103 and/or one or more surface maintenance tools 118. Electric motors 112 supply torque to the surface maintenance machine, including the torque to rotate the wheels 103 in order to propel the surface maintenance machine 100 in a selected direction. Electric motors 112 supply torque to the maintenance head assembly 116, in general, and to one or more surface maintenance tools 118, in particular. Additional components may be inserted between those shown; the electrical schematic merely provides the basic operative connections.

Referring back to FIGS. 1A-1C, in some embodiments, the interior of the surface maintenance machine 100 can include a vacuum system (not shown) for removal of debris from the surface. In such embodiments, the interior can include a on-board solution tank 120 and a fluid recovery tank 122. The on-board solution tank 120 tank can include a fluid source such as a cleaning or sanitizing fluid that can be applied to the surface during treating operations. In advantageous embodiments, the cleaning or sanitizing fluid can be water. The fluid recovery tank 122 holds recovered fluid that has been applied to the surface and soiled. The interior of the surface maintenance machine 100 can include passageways (not shown) for passage of debris and dirty liquid. In some such cases, the vacuum system can be fluidly coupled to the fluid recovery tank 122 for drawing dirt, debris or soiled liquid from the surface. The vacuum system may comprise a vacuum-assisted squeegee mounted to extend from a lower rearward portion of surface maintenance machine 100. Fluid, for example, clean liquid, which may be mixed with a detergent, can be dispensed from the on-board solution tank 120 to the floor beneath surface maintenance machine 100, in proximity to the scrubbing brushes, and soiled scrubbing fluid is drawn by the squeegee centrally, after which it is suctioned via a recovery hose into the fluid recovery tank 122. Surface maintenance machine 100 can also include a feedback control system to operate these and other elements of surface maintenance machine 100, according to apparatus and methods which are known to those skilled in the art.

In alternative embodiments, the surface maintenance machine 100 may be combination sweeper and scrubber machines. In such embodiments, in addition to the elements describe above, the surface maintenance machine 100 may either be an air sweeper-scrubber or a mechanical sweeper-scrubber. Such a surface maintenance machine 100 can also include sweeping brushes (e.g., rotary broom) extending toward a surface (e.g., from the underside of the surface maintenance machine 100), with the sweeping brushes designed to direct dirt and debris into a hopper. In the cases of an air sweeper-scrubber, the surface maintenance machine 100 can also include a vacuum system for suctioning dirt and debris from the surface 120. In still other embodiments, the surface maintenance machine 100 may be a sweeper. In such embodiments, the surface maintenance machine 100 may include the elements as described above for a sweeper and scrubber surface maintenance machine 100, but would not include the scrubbing elements such as scrubbers, squeegees and fluid storage tanks (for detergent, recovered fluid and clean liquid).

With continued reference to FIGS. 1A-1C, the mobile surface maintenance machine can be provided with an on-board pressure washer 200. The pressure washer may be operated to pressure wash an area, for instance, by manually applying pressurized cleaning fluid (e.g., water). For example, the mobile surface maintenance machine may operate upon a surface and treat a surface. During, before or after maintenance of the surface, an operator may drive the mobile surface maintenance machine to a target area, and stop the machine from propelling, and optionally, stop the machine from performing maintenance operation. The operator may then engage the pressure washer to apply pressurized cleaning fluid and wash an area. In some embodiments, the pressure washer can be useful for pressure washing areas that may not be adequately maintained by the surface maintenance machine (e.g., floors that have oil stains). Alternatively, the pressure washer can be useful for washing areas that may not be easily accessible by the surface maintenance machine (e.g., walls, corners, recesses, stairs, etc.). Any use of the pressure washer to apply pressurized cleaning fluid and wash an area can be contemplated, and the use of the disclosed embodiments of the pressure washer is not limited to the examples listed herein.

Figure 2:
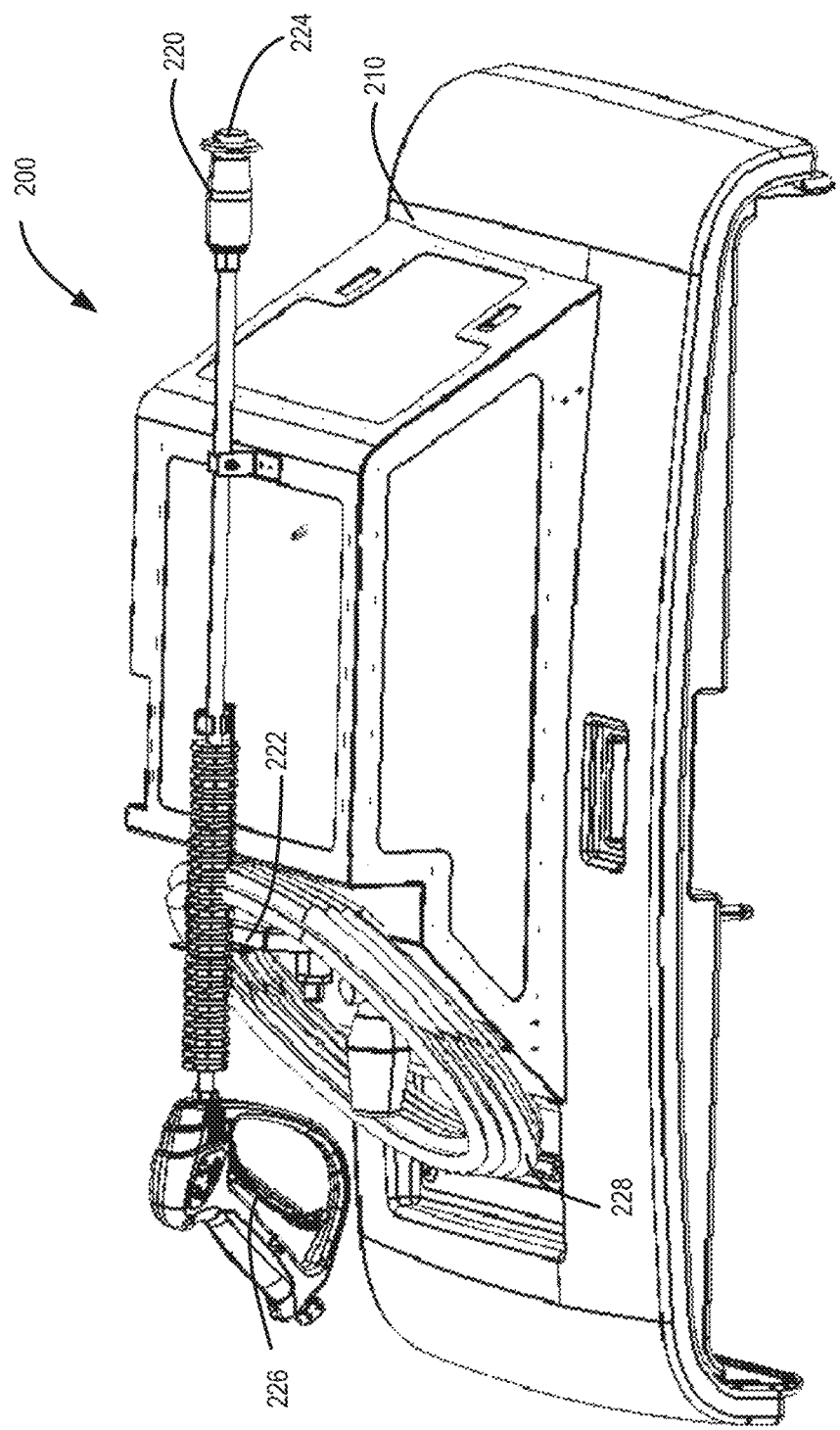
FIG. 2 is a perspective view of a pressure washer provided at the surface maintenance machine of FIGS. 1A-1D according to an embodiment of the present disclosure.

With continued reference to FIG. 2, components of the pressure washer can be positioned on an exterior of the body for ease of access by an operator. According to some such embodiments, the pressure washer can be positioned to a rear of a transverse center plane 204 of the machine. In this embodiment, the rear can be opposite to a forward direction 208 of travel of the machine. In the illustrated embodiment, the pressure washer is positioned on a body panel to the rear of the operator cab, however, other locations thereof are contemplated.

In further advantageous embodiments, an entirety of the pressure washer (with the exception of one or more of fluid hoses, couplings, electrical wires and connectors) may be positioned on and supported by an exterior surface 210 of the machine. Such embodiments may permit the pressure washer to be located on existing machines (e.g., as a retrofit) without having to reposition or repackage other components of the surface maintenance machine. In the illustrated embodiment, the exterior surface 210 is a top surface of the machine. Alternatively, other surfaces (e.g., lateral surfaces, rear surfaces or other suitable locations) can support the pressure washer. Alternatively, only certain portions of the pressure washer may be positioned on an exterior surface 210 of the machine.

As seen in FIG. 2, the pressure washer includes a spray wand 220. The spray wand 220 can be rested in a holster 222 when not in use. Holster 222 may be placed in any convenient location relative to the machine. The spray wand 220 terminates in a nozzle 224 that can dispense the cleaning fluid therethrough. Accordingly, as may be appreciated, the spray wand 220 can include fluid passageways that may be in fluid communication with the nozzle 224. The fluid passageways can also be in fluid communication with other components of the pressure washer (to be described), and indirectly be in fluid communication with the fluid tank so as to receive cleaning fluid therefrom. The spray wand 220 can include a trigger 226 located opposite to the nozzle 224. The trigger 226 can be actuated (e.g., by an operator's thumb and/or fingers) to enable cleaning fluid from the fluid tank to flow (via components of the pressure washer) and through fluid passageways, ultimately exiting the spray wand 220 via the nozzle 224. The dimensions of the spray wand 220 and the nozzle 224 can be chosen so as to provide a desired pressure for pressure washing operations. A hose 228 may couple to the spray wand 220 near the trigger 226 to move the spray wand 220 to a location away from the machine and engage the trigger 226 to perform a pressure washer.

Figure 3:
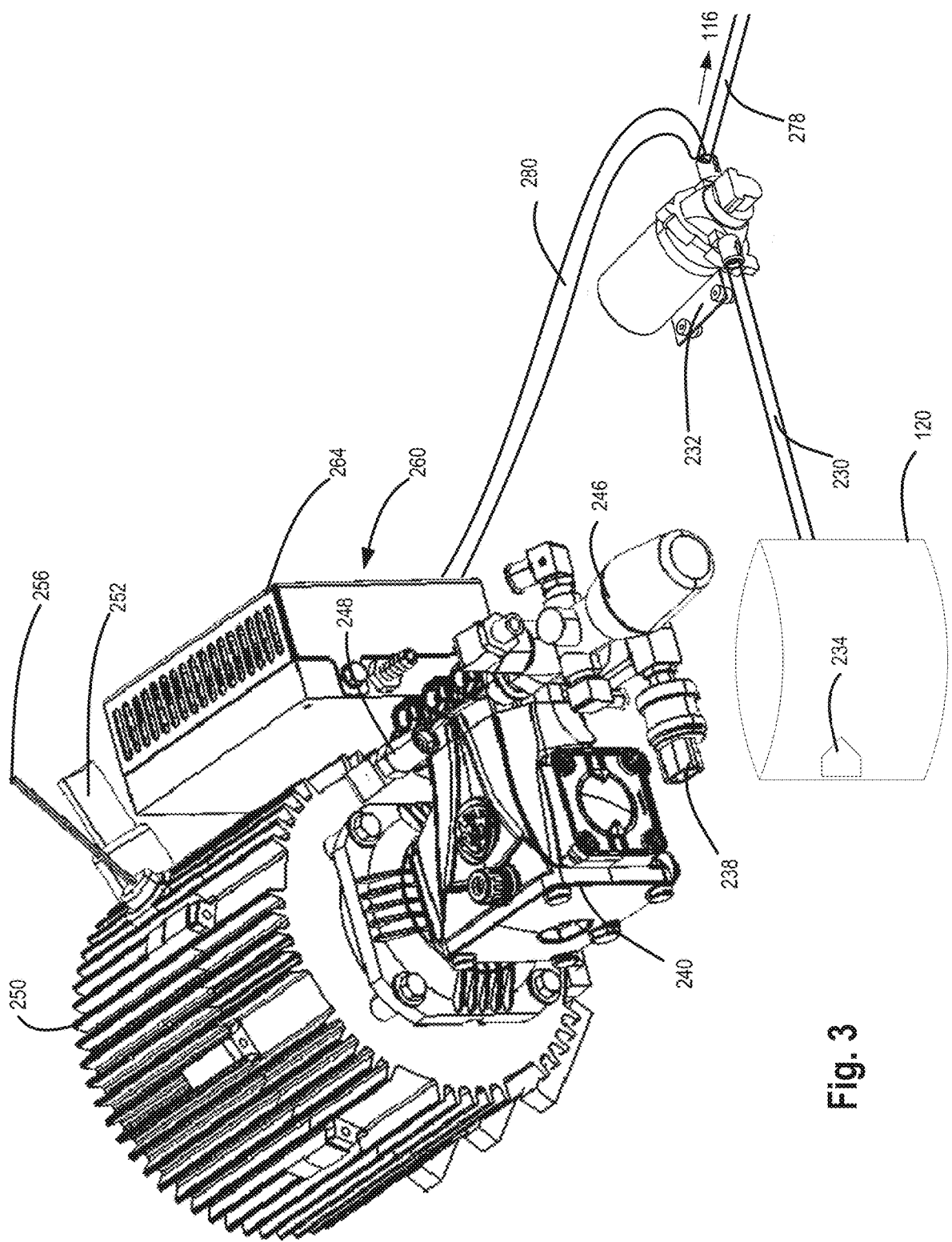
FIG. 3 is a partial interior perspective view of a mobile surface maintenance machine (vehicle) and the pressure washer of FIGS. 1 and 2.

As will be described further below, in advantageous aspects, the pressure washer can be powered by the batteries 114 of the mobile surface maintenance machine. Further, as mentioned above, the pressure washer can use cleaning fluid from the on-board fluid tank. Accordingly, the pressure washer can be fluidly coupled to the on-board fluid tank and a feed pump 232 of the surface maintenance machines. FIG. 3 illustrates a partial perspective view of the pressure washer. In FIG. 3, exterior housing 264 of the pressure washer have been removed to facilitate ease of visualization of components of the pressure washer. As seen in FIG. 3, the pressure washer can receive fluid from the on-board fluid tank (best seen in FIGS. 1A-1C) via an interior flow channel 230. In one example, the interior flow channel 230 can be in the form of a hose or a tube. FIG. 3 also illustrates two output flow channels 278, 280 from the feed pump 232. Output channel 278, which again may be a hose, feeds cleaning fluid from on-board solution tank 120 to the maintenance head assembly 116 or to a location proximate a surface maintenance tool of the maintenance head assembly 116. The maintenance head assembly 116 and/or its surface maintenance tool may then provide surface maintenance on a wet floor. Output channel 280, which again may be a hose, feeds cleaning fluid from the same on-board solution tank 120 towards the pressure washer.

With continued reference to FIG. 3, the machine can include a feed pump 232 fluidly coupled to the fluid tank. Since feed pump 232 may be a smaller pump, feed pump 232 includes both an electric motor and a feed pump within the same housing. Of course, feed pump 232 may also have an electric motor located outside the housing for the pump. The electric motor can be in electrical communication (e.g., via electric wires) with an batteries 114 (e.g., one or more of the vehicle battery). Alternatively, the electric power source can be an external power source. With reference to FIG. 3, the electric motor within feed pump 232 can thus receive electric power from the batteries 114 and may receive cleaning fluid (e.g., water, either alone or in combination with detergent, sanitizer, and the like) from the fluid tank and may pressurize the cleaning fluid to a first pressure. In one aspect of the invention, the feed pump 232 can be replaced with a gravity feed system. That is, if the on-board solution tank 120 is located higher on the machine than the maintenance head assembly 116 and the intake of the pressure washer, then a gravity feed arrangement where gravity is used to supply cleaning fluid from the on-board solution tank 120 may be used to feed cleaning fluid under a lower pressure (e.g., 10 psi) instead of an active pump, such as feed pump 232.

Referring back to the basic electrical schematic of FIG. 1D, feed pump 232 receives power from batteries 114 via suitable electrical controls that may control or regulate the power to the feed pump 232. The feed pump 232 then supplies cleaning fluid to the floor and/or, as discussed below, to a pressure pump. The cleaning fluid can be applied to the floor at one or more locations, including the floor surface on which the surface maintenance tools 118 perform surface maintenance (e.g., floor areas scrubbed by scrub brushes). Additional components may be inserted between those shown; the electrical schematic merely provides the basic operative connections to the feed pump 232.

As seen from FIG. 3, the on-board solution tank 120 can have one or more onboard sensors (233, best seen in FIG. 4) to verify operation of the fluid tank and/or the feed pump 232. For instance, in one example, as seen in FIG. 3, a fluid tank level sensor 234 can be coupled to the fluid tank, and can monitor the amount of cleaning fluid remaining in the on-board solution tank 120. The fluid tank level sensor 234 can be in operative communication with the operator console 110 (shown in FIGS. 1A-1C) to provide an indication (e.g., as a visual graphical icon on a display in the operator console 110) of the level of fluid remaining the fluid tank 120. The fluid tank level sensor 234 can also indicate if the level of fluid remaining in the on-board solution tank 120 is below a predetermined volume. Further, the fluid tank level sensor 234 can provide an indication (e.g., an electrical signal output, a visual graphical icon on the operator console 110, audible alarm, and the like) if the on-board solution tank 120 is empty.

In additional or alternative embodiments, a feed pump sensor may be coupled to the feed pump 232 to monitor the operation of the feed pump 232. In an example, the feed pump sensor may monitor pressure of the feed pump 232, and provide indication of whether the feed pump 232 is in operation. In advantageous aspects, the feed pump sensor 238 may be the same component that may monitor a pressure of a pressure pump 240 (to be described). Alternatively, the feed pump sensor may include other types of sensors that may monitor other quantities of the feed pump 232, and provide an indication of whether the feed pump is in operation. For instance, the feed pump sensor 238 can provide an indication (e.g., an electrical signal output, a visual graphical icon on the operator console 110, audible alarm, and the like) if the feed pump 232 is operating. The feed pump sensor 238 can also provide another indication (e.g., an electrical signal output, a visual graphical icon on the operator console 110, audible alarm, and the like) if the feed pump 232 is not operating. Such embodiments may permit operation of the pressure washer only under certain permissible operating conditions so as to reduce the chances of damage to components of the pressure washer (e.g., if fluid line stops supplying fluid to the pressure pump due to a disconnected hose, and the like). Such embodiments may also permit the use of available resources (e.g., cleaning fluid, electric power from the batteries 114) on the mobile surface maintenance machine efficiently.

Figure 4:
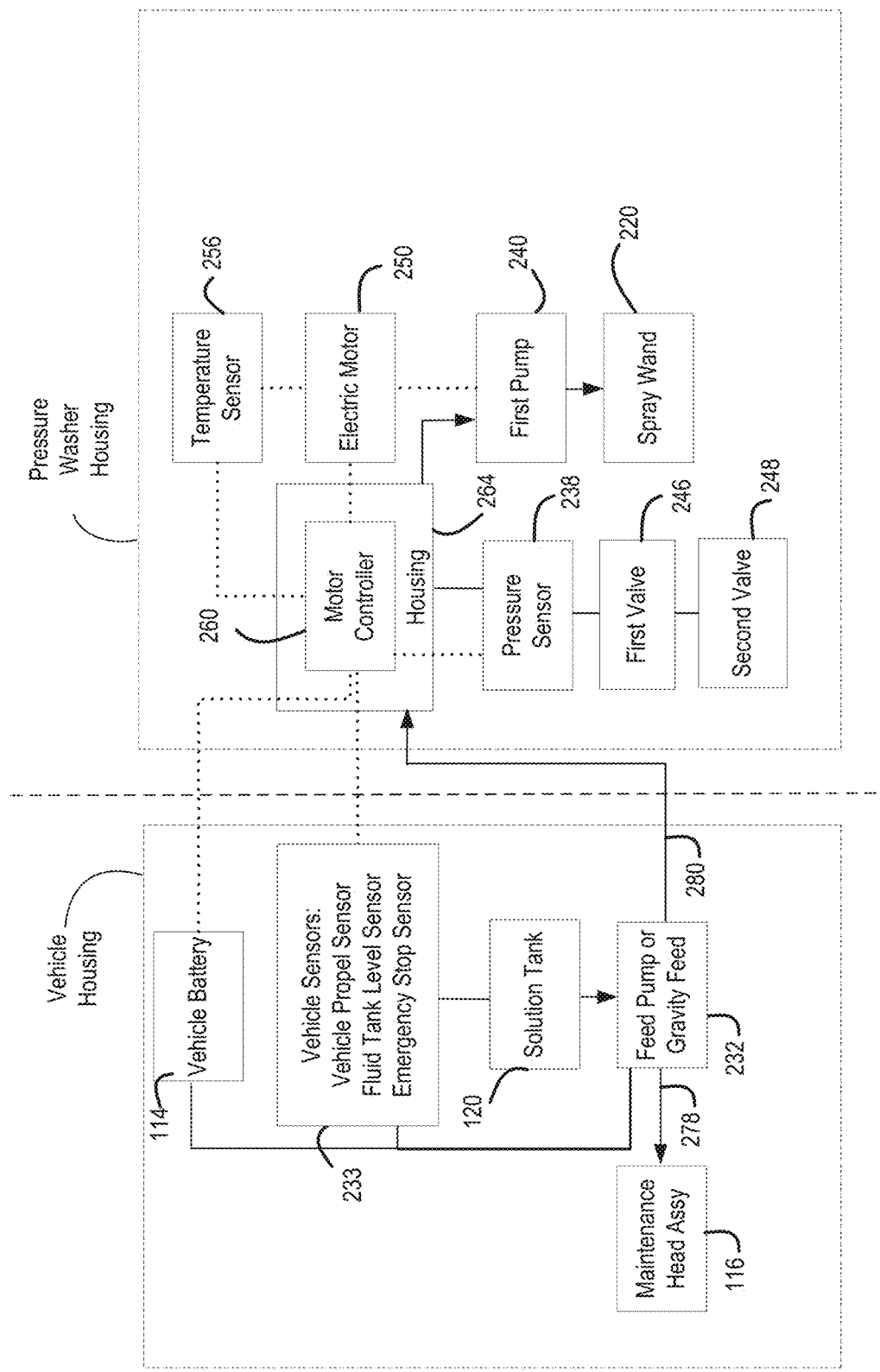
FIG. 4 is a schematic that illustrates various components of the pressure washer of FIG. 2 wherein solid lines indicate fluid coupling, solid lines with arrows indicate flow direction, and dotted lines indicate electrical coupling.

As seen in FIG. 3, the pressure washer can include a pressure pump 240. FIG. 4 is a schematic that illustrates the positioning of the pressure pump 240 along with associated components of the pressure washer. As seen therefrom, the pressure pump 240 can be fluidly coupled (e.g., via one or more fluid fittings, such as hose barbs, clamps, or other types of fluid connectors) to the spray wand 220 and positioned upstream thereof to supply the cleaning fluid to the spray wand 220. The pressure pump 240 can be fluidly coupled to and located downstream of the feed pump 232. The pressure pump 240 can pressurize the cleaning fluid received from the feed pump 232 at a first pressure to a second pressure, the second pressure being greater than the first pressure. Low pressure feeds are typically pressured to about 45 psi. In certain embodiments, the second pressure can be greater than about 1000 psi. In some embodiments, the second pressure can be greater than 2500 psi. The flow rate of the cleaning fluid at these second pressures can be greater than 1 gallon a minute. In some embodiments, the flow rate is greater than 1.5 gallons a minute and may be greater than 2 gallons per minute.

In certain embodiments, the pressure pump 240 can be a piston pump that can also be electrically powered by the batteries 114, as will be described further below. In an embodiment, the pressure pump 240 can generally operate at constant speeds and be powered by an electric motor that rotates at a constant rate of rotation. In some such cases, the pressure pump 240 may deliver a generally constant volumetric flow rate of the cleaning fluid to the spray wand 220. Alternatively, in other embodiments, the pressure pump 240 can operate at variable speeds and/or provide a variable volumetric flow rate of the cleaning fluid to the spray wand 220.

Referring to FIGS. 3 and 4, in advantageous aspects, the pressure washer can include a pressure sensor positioned in fluid communication with the pressure pump 240. In certain advantageous aspects, the pressure sensor can be the feed pump sensor 238. The feed pump sensor 238 can measure pressure in the fluid line that couples the pressure pump 240 with the feed pump 232 and to determine whether the pressure pump 240 is receiving the cleaning fluid from the feed pump 232 at acceptable pressures, as further described below. In advantageous embodiments, the feed pump sensor 238 can provide an additional indication of whether the feed pump 232 is supplying cleaning fluid to the pressure pump 240 and ensure that the flow lines connecting the feed pump 232 to the pressure pump 240 are not occluded.

The feed pump sensor 238 can, in some cases be a pressure switch 244 that can include electrical circuitry that can be in operative communication with the operator console 110 to provide an indication (e.g., as a visual graphical icon on a display in the operator console 110, an electrical signal etc.) of the pressure measured by the feed pump sensor 238. In certain advantageous aspects, the pressure switch 244 can be in electrical communication with the pressure pump 240, and if the pressure measured by the feed pump sensor 238 is less than a first predetermined pressure, the pressure switch 244 can fluidly and/or electrically communicate with the pressure pump 240 and stop the operation of the pressure pump 240. Such embodiments can advantageously reduce the chances of damage of the pressure pump 240, for instance, as a result of running "dry."

With continued reference to FIGS. 3 and 4, in one exemplary embodiment, the first valve 246 can be an unloader valve. In such embodiments, if the pressure in spray wand is greater than a second predetermined pressure, the first valve 246 can be actuated to redirect any cleaning fluid in the fluid line back to the fluid tank, and thereby reduce the risk of overpressuring the spray wand (e.g., inadvertent release of the trigger of the spray wand when not in use) and/or damage to the pressure pump 240.

In additional or alternative aspects, as described above, the pressure switch 244 can also be in electrical communication with electric motor (as will be described further below), and stop the operation of the pressure pump 240 (e.g., by sending a signal to a control algorithm as will be described below) such that the pressure pump 240 may not be operated until it receives cleaning fluid at appropriate pressures.

Alternatively, the feed pump sensor 238 can be a pressure transducer. In such embodiments, some or all of the functionalities described above with respect to the pressure switch 244 may be performed by the pressure transducer. Additional electrical components, such as switches can be provided in such cases to shut off operation of the pressure pump 240 in the event that the measured pressure upstream of the pressure pump 240 is less than the first predetermined pressure.

In certain optional embodiments, as seen in FIGS. 3 and 4, the pressure washer also includes additional fluid components such as valves or pressure regulators that can reduce the chances of the cleaning fluid from being overpressurized. As seen from FIGS. 3 and 4, the pressure washer can include a second valve 248. The second valve 248 can be in fluid communication with the pressure pump 240. The second valve 248 can vent and/or redirect fluid back to the fluid tank in the event of the pressure in the fluid line (as measured by the feed pump sensor 238) exceeding the second predetermined pressure.

As seen from FIGS. 3 and 4, an electric motor 250 can be operatively coupled to and configured to drive the pressure pump 240. The electric motor 250 can receive electric power from the batteries 114 positioned within the mobile surface maintenance machine. Accordingly, one or more electrical cables 252 can operatively connect and/or establish operative communication between the batteries 114 and the electric motor 250. Advantageously, the electric motor 250 may be a dedicated motor and separate from other electric motors that drive other components (e.g., wheel, surface maintenance tools) of the surface maintenance machine. The surface maintenance machine may, however, have a common electric power source (array of batteries) to power all the electric motors on the machine, including the electric motor 250.

In an embodiment, the electric motor 250 can be a brushed or brushless, totally enclosed non-ventilated DC motor. In some such embodiments, the electric motor may have a motor housing that is liquid proof to reduce the chances of liquid ingress. Such a liquid proof motor prolongs the lifespan of the electric motor if it is positioned on and supported by an exterior surface 210 of the machine, as described above, such as on the top surface of the machine. At such a location, the electric motor 250 is likely to be sprayed with cleaning fluid. Alternatively, other types of electric motors that can provide motive power (e.g., torque) to drive the electric pump can be contemplated without loss of functionality. In another aspect, a liquid-cooled motor is used as the electric motor 250. In one aspect, a fan-cooled motor is used as the electric motor 250. The fan-cooled motor may be located on an exterior surface 210 of the machine, as described above, or in an interior location of the machine. In some such designs, baffles or other obstructions may be added to help deflect liquids and prevent them from contacting the fan-cooled motor.

Figure 5:
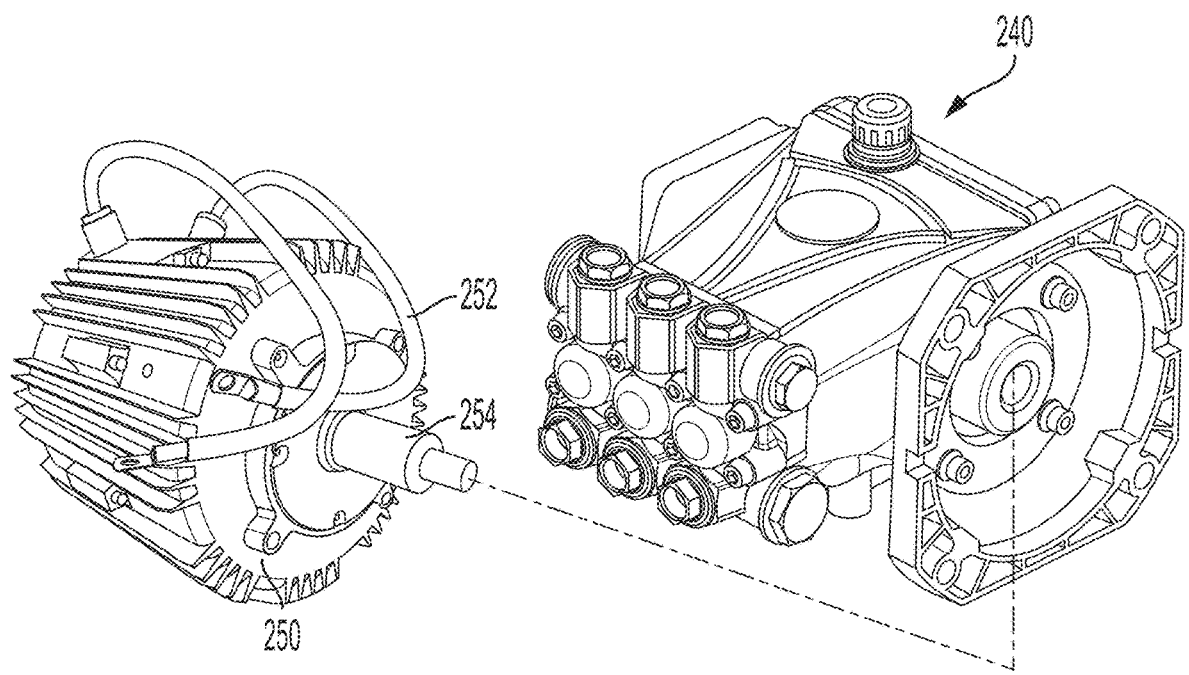
FIG. 5 is a perspective view illustrating an electric motor and pressure pump of the pressure washer of FIG. 2.

With continued reference to FIG. 3, in an embodiment, the pressure pump 240 and the electric motor 250 may be directly coupled so as to efficiently package components of the pressure washer. Accordingly, a direct coupling between the pressure pump 240 and the electric motor 250 may be established through a drive shaft 254, as shown in FIG. 5. As seen therefrom, the electric motor 250 has a drive shaft 254 that may be directly coupled to the pressure pump 240. Couplings (e.g., flanges with fasteners as shown in FIG. 5) may provide a frictional connection between the pressure pump 240 and the electric motor 250. In some such embodiments, the drive shaft 254 may optionally be keyed to facilitate ease of assembly and positioning of the pressure pump 240 to the electric motor 250.

In certain embodiments, the electric motor 250 can draw a current of between about 50 amperes and about 100 amperes (e.g., about 85 amperes). Further, in some such embodiments, the electric power source (e.g., batteries 114 or external power source) may have a voltage output between 30 volts and about 40 volts (e.g., about 35 volts). The electric motor 250 may, in some embodiments have a power rating of between about 2 horsepower and about 10 horsepower (e.g., about 6 horsepower). In some such embodiments, the electric motor 250 may receive electric power when a certain set of operating parameters are met, so as to optimize usage of the onboard resources (e.g., electric power and cleaning fluid). For instance, the electric motor 250 may receive electric power when the batteries 114 is not providing power to propel the mobile surface maintenance machine, and/or to perform one or more operations. Such embodiments may advantageously ensure that the amount of power available from the batteries 114 is sufficient to meet the power requirements of the electric motor 250.

As best seen in FIG. 4, according to some aspects a temperature sensor 256 may be in operative communication with the electric motor 250. In some embodiments, the temperature sensor 256 may be mounted on to a component of the electric motor 250 (e.g., directly on to the windings, on the motor housing 264, and the like). The temperature sensor 256 may measure the temperature of the electric motor 250 during operation, and the measured temperature can be used to determine whether the electric motor 250 is being overheated according to an embodiment of the present disclosure.

In alternative or additional embodiments, the electric motor 250 can be operatively coupled to (e.g., by wired connection) to a current sensor. The current sensor may monitor the amount of current drawn by the electric motor 250. The measured current can be used to determine whether the electric motor 250 is being overheated according to additional or alternative embodiments of the present disclosure.

As seen from FIGS. 3 and 4, the pressure washer can include a motor controller 260 that can be in operative communication with one or more components of the pressure washer. In the illustrated embodiment, for instance, the motor controller 260 is in operative communication with each of the electric motor 250 and the pressure pump 240. Referring again to FIG. 1D, motor controller 260 is shown in operative communication with the electric motor 250, pressure pump 240, and batteries 114. Additionally, or alternatively, the motor controller 260 may also be in direct operative communication with the batteries 114. As shown, pressure pump 240 receives cleaning fluid from feed pump 232. Additional components may be inserted between those shown; the electrical schematic merely provides the basic operative connections to the pressure pump 240.

Additionally, or alternatively, the motor controller 260 may also be in direct operative communication with the batteries 114. Additionally, the motor controller 260 may be in operative communication with one or more onboard sensors 233, such as the fluid tank level sensor 234 coupled to the fluid tank that monitors the amount of cleaning fluid remaining in the fluid tank. The motor controller 260 may be in operative communication with the feed pump sensor 238 that can monitor the operation of the feed pump 232. Further, the motor controller 260 may also be in operative communication with the feed pump sensor 238 that can measure pressure in the fluid line that couples the pressure pump 240 to the feed pump 232. In addition, the motor controller 260 may also be in communication with the temperature sensor 256 or current sensor that can monitor motor temperature or current draw to determine whether the electric motor 250 is being overheated.

In aspects of the present disclosure, operative communication between the motor controller 260 and one or more of the electric motor 250, the pressure pump 240, the batteries 114 and the sensors described herein may be direct (e.g., by electrical wires) or indirect (e.g., no direct electrical coupling between sensors and motor controller 260) connection with each other.

In some embodiments, the motor controller 260 can be a permanent magnet motor controller 260 with a power rating capable of handling the current drawn by the motor. In some embodiments, the electric motor 250 may draw between about 85 amperes and about 90 amperes, as described previously. Accordingly, in such embodiments, the permanent magnet motor controller 260 may have a power rating of at least twice the current drawn by the motor. In one embodiment, the motor controller 260 may have a power rating of about 200 amperes.

Referring back to FIG. 4, the motor controller 260 is housed on a housing 264. In certain advantageous embodiments, the housing 264 can dissipate heat from surfaces of the motor controller 260. Accordingly, in certain aspects, the housing 264 can include (e.g., be fabricated from) a material that has a generally high thermal conductivity so as to rapidly dissipate heat from surfaces of the motor controller 260. In one example, the housing 264 can include (e.g., be fabricated from) aluminum. Materials having thermal conductivity generally in the same order of magnitude as aluminum are also contemplated.

Figure 6:
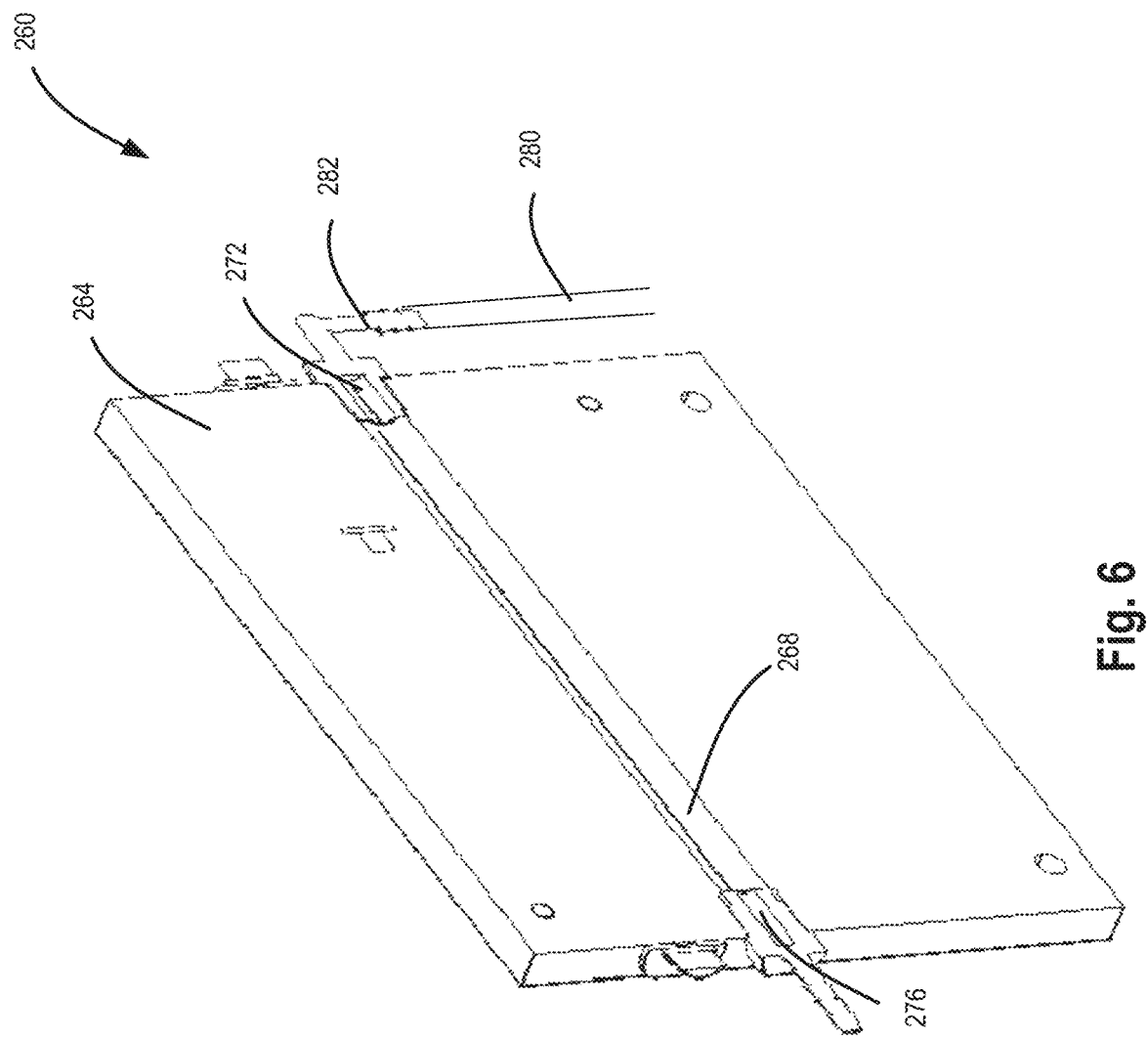
FIG. 6 is a sectional perspective view of a motor controller according to an embodiment of the present disclosure.

In additional or alternative aspects, the motor controller 260 can be cooled by directing the cooling fluid through a flow passage 268 therethrough. Accordingly, in such embodiments, the motor controller 260 can be in fluid communication with the feed pump 232 to receive cleaning fluid therefrom which can cool the motor controller 260. FIG. 6 is a sectional perspective view of the housing 264 of the motor controller 260. As seen therefrom, the housing 264 comprises a flow passage 268 extending through the housing 264. The flow passage 268 can be a "through-passage" and can extend substantially along an entire dimension (e.g., length, width, thickness and the like) of the housing 264. In the illustrated embodiment, the flow passage 268 extends lengthwise along the housing 264.

With continued reference to FIG. 6, the flow passage 268 can have an inlet 272 and an outlet 276. The inlet 272 can be fluidly coupled (e.g., via hose 280 and barb fittings 282), to the feed pump 232. The inlet 272 of the flow passage 268 can be positioned downstream thereof, such that the cleaning fluid from the feed pump 232 passes through the inlet 272 of the flow passage 268, enters the flow passage 268 and passes through the housing 264. The outlet 276 of the flow passage 268 can be in fluid communication with the pressure pump 240 and/or components such as pressure sensors, etc. Accordingly, the cleaning fluid (e.g., pressurized water) can flow through the housing 264 of the motor controller 260 prior to entering the pressure pump 240, thereby cooling the motor controller 260.

In advantageous aspects, the motor controller 260 can be a programmable motor controller 260, a programmable computer such as a microprocessor, a programmable logic controller, and the like, and can include (and/or be in communication with) on-board or remote non-transitory storage media for storing instructions in the form of algorithms and/or data. The controller can also be application specific integrated circuits (ASICs), microcontrollers, microprocessors, field-programmable gate arrays (FPGAs), or any other appropriate structure capable of receiving and processing data, as well as, circuitry distributed across a network to receive and process data and control system operation as described herein from a remote location. In aspects of the present disclosure, the motor controller 260 may receive electrical signals from one or more sensors described herein and can execute one or more control algorithms disclosed herein to initiate supply of electric power or stop supply of electric power to the electric motor 250.

In certain aspects of the disclosure, the motor controller 260 can regulate the supply of electric power to the electric motor 250. Accordingly, the motor controller 260 can be configured to receive current from the batteries 114 and supply or stop supplying current to initiate or stop operation of the electric motor 250 respectively, based on one or more operating conditions of the surface maintenance machine and/or one or more operating conditions of the electric motor 250 and the pressure pump 240 according to control algorithms.

As noted, the regulation and/or start and stop of current flow to the electric motor 250 can be provided by the motor controller 260. In one embodiment, the motor controller 260 may convert a DC input signal from the batteries 114 to a DC output signal to drive the electric motor 250. Advantageously, the motor controller 260 may not convert the DC input signal to an AC signal and instead may directly convert the DC input signal to a DC output signal, unlike conventional power circuits in surface maintenance machines, thereby improving power conversion efficiency. In some embodiments, the motor controller 260 may generate DC output signals in the form of pulse width modulated (PWM) signals to provide current flow over a desired duty cycle (e.g., 50%, 75%, etc.) Such embodiments may advantageously provide control of motor parameters (e.g., including speed) via the PWM signals. Moreover, in instances where the DC voltage provided by the power source fluctuates, such as where the power source is provided by batteries, the motor controller 260 may modify the duty cycle of its PWM output in order to try and provide an effective output voltage that remains consistent. The consistent effective output voltage from motor controller therefore controls the speed of the electric motor 250 to a generally constant speed.

Figure 7:
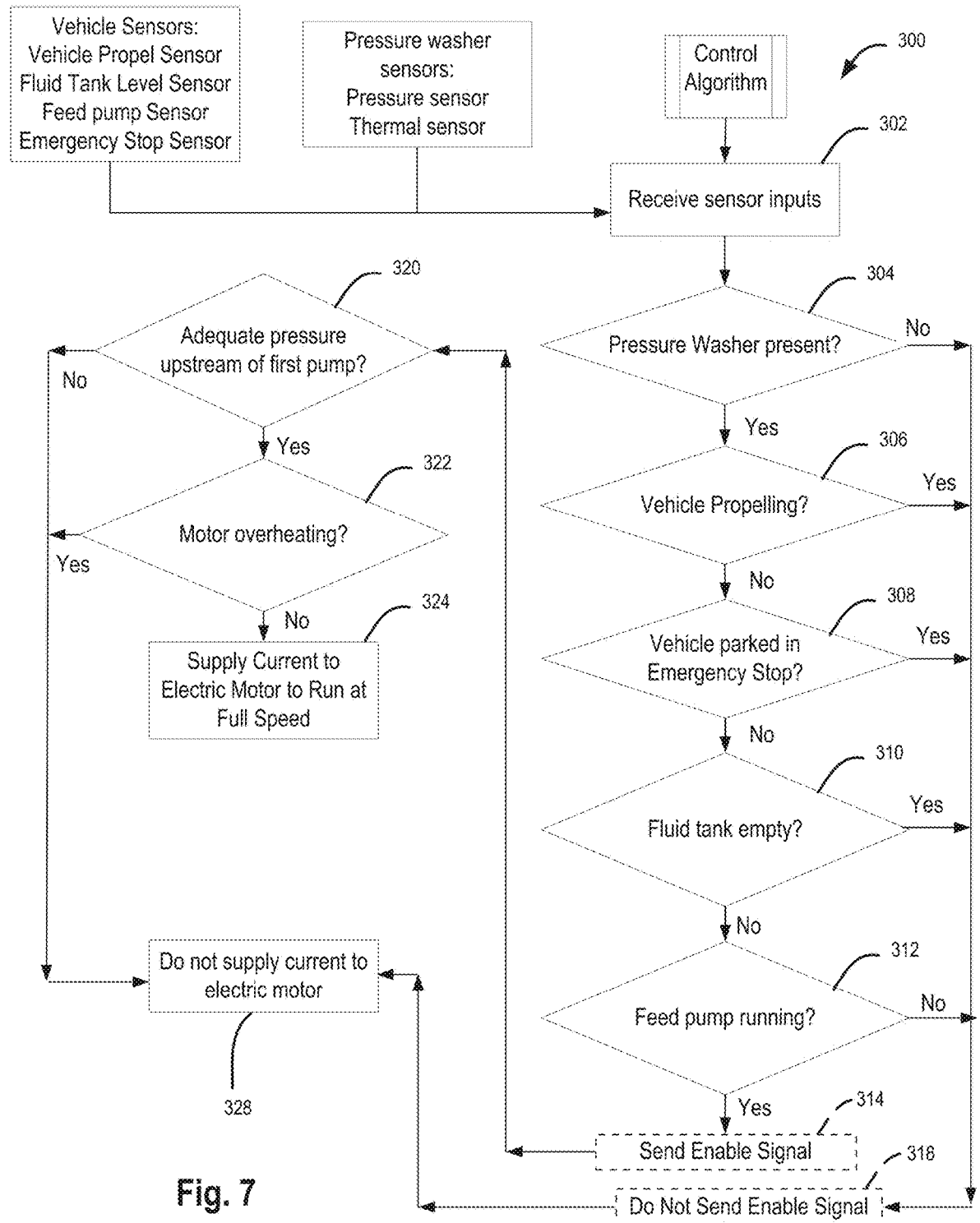
FIG. 7 is a control algorithm executed by the motor controller according to an embodiment of the present disclosure.

As described previously, aspects of the present disclosure may also include a control algorithm 300 to determine whether the motor controller 260 can start or stop supply of electric current to the electric motor 250. FIG. 7 shows a non-limiting exemplary embodiment that can be executed by the motor controller 260. At step 302, the motor controller 260 can receive one or more sensor inputs. FIG. 7 provides a non-exhaustive list of sensors, one or more of which may be provided on the vehicle or on the pressure washer. For example, the vehicle may include a sensor (e.g., an optical encoder, accelerometer, and the like) that may send a signal to the motor controller 260 to indicate whether the vehicle is in motion and/or performing a surface maintenance operation. Additionally or alternatively, the vehicle may have a vehicle computer that controls operation of the vehicle that can be in operative communication with the motor controller 260 to provide information indicative of whether or not the vehicle is propelling, or if the vehicle is performing a surface maintenance operation or if the vehicle is stopped, whether the vehicle is in an emergency stop.

Further, additional sensors, such as a fluid tank level sensor 234 measuring of a level of cleaning fluid in the cleaning fluid tank, and a feed pump sensor 238 measuring of operation of the feed pump 232 may send electrical signals to the motor controller 260 indicative of the level of cleaning fluid in the cleaning fluid tank, and operation of the feed pump 232. Additionally, the feed pump sensor 238 of the pressure washer and the temperature sensor 256 of the electric motor 250 can also communicate with the motor controller 260 by sending one or more electrical sensors indicative of whether the cleaning fluid is at adequate pressure to run the pressure pump 240 and whether the electric motor 250 is overheating, respectively. The motor controller 260 may use the sensor inputs to decide whether to enable operation of the electric motor 250 by supplying electric power from the power electric source. Additional or alternative embodiments may provide sensors or circuits to determine whether the battery has enough stored energy to complete a pressure washing operation. Additional or alternative embodiments may also include sensors or circuits to determine if the motor controller (in addition to or instead of the motor) is overheating and/or if there is an under-voltage or an over-voltage condition.

With continued reference to FIG. 7, the motor controller 260 can receive signals from the mobile surface maintenance machine indicative of one or more operating conditions of the mobile surface maintenance machine. The motor controller 260 can also receive signals indicative of one or more operating conditions of the electric motor 250 and the pressure pump 240 respectively. The motor controller 260 can determine whether the one or more operating conditions of the mobile surface maintenance machine indicate that the one or more operating conditions of the mobile surface maintenance machine are configured to permit operation of the pressure washer. Further, the motor controller 260 can also determine whether one or more operating conditions of the electric motor 250 and the pressure pump 240 indicate that the one or more operating conditions of the electric motor 250 and the pressure pump 240 are configured to permit operation of the pressure washer.

Accordingly, at step 304 the motor controller 260 determines, based on signals received from the vehicle computer or one or more sensors, whether the machine has an onboard pressure washer. At step 306, the motor controller 260 can determine, based on signals received from the vehicle computer or one or more sensors whether the vehicle is propelling and/or performing a surface maintenance operation. At step 308, the motor controller 260 can determine, based on signals received from the vehicle computer or one or more sensors, whether the vehicle is stopped in an emergency stop. At step 310, the motor controller 260 can determine, based on signals received from the fluid tank level sensor 234, whether the fluid tank is empty. At step 312, the motor controller 260 can determine, based on signals received from the feed pump sensor 238, whether the feed pump 232 is operational.

In alternative or additional embodiments, steps 302 to 312 may be performed by a vehicle controller. At optional step 314, an enable signal may be generated by the vehicle controller and sent to the motor controller 260, when one or more of the following conditions are met: if the onboard sensors indicate that the mobile surface maintenance machine is not being propelled or not performing a surface maintenance operation, if the vehicle is not parked in an emergency stop, if the solution tank is not empty, if the feed pump 232 is operating. At optional step 318, an enable signal may not be sent to the motor controller 260, when one or more of the following conditions are met: if the onboard sensors indicate that the mobile surface maintenance machine is being propelled, or performing a surface maintenance operation, or if the vehicle is parked in an emergency stop, if the solution tank is empty, if the feed pump 232 is not operating.

Continuing with the exemplary algorithm of FIG. 7, at step 320, the motor controller 260 can determine, based on signals received from the feed pump sensor 238, whether the pressure pump 240 receives the cleaning fluid at an adequate pressure upstream thereof. At step 322, the motor controller 260 can determine, based on signals received from the temperature sensor 256, whether the electric motor 250 is overheating. The motor controller 260 can start supplying at step 324 current to the electric motor 250 when one or more of the following conditions are satisfied: if the onboard sensors indicate that the mobile surface maintenance machine is not being propelled, or if the machine is not performing a surface maintenance operation, or if the vehicle is not parked in an emergency stop, if the solution tank is not empty, if the feed pump 232 is operating, if the pressure pump 240 receives cleaning fluid at adequate pressures, and optionally, if an enable signal is received (e.g., at step 314). At step 328, the motor can controller stop supplying current to the electric motor 250 when one or more of the following conditions are satisfied: if the onboard sensors indicate that the mobile surface maintenance machine is being propelled (and/or performing a surface maintenance operation), or if the machine is performing a surface maintenance operation, or if the vehicle is parked in an emergency stop, if the solution tank is empty, if the feed pump 232 is not operating and optionally, if an enable signal is not received (e.g., at step 318).

Optionally, the motor controller 260 can send an output signal to the electric motor 250, whereby, upon receipt of the output signal from the motor controller 260, the electric motor 250 receives electric power from the batteries 114 and drives the pressure pump 240. The output signal can be in the form of modulated signals (e.g., pulse width modulated signals) and can regulate (e.g., duty-cycle) current supply to the electric motor 250. Upon receipt of the signal, the electric motor 250 may generate torque and drive the pressure pump 240, thereby generating pressurized cleaning fluid to be dispensed through the spray wand 220 for a pressure washing operation.

Embodiments of the present disclosure provide one or more advantages. In certain embodiments, an entirety of the pressure washer (with the exception of fluid hoses, couplings, and electrical wires and connectors) may be positioned on and supported by an exterior surface 210 of the machine and may use resources already available on existing surface maintenance machines. Such embodiments may permit the pressure washer to be located on existing machines (e.g., as a retrofit) without having to reposition or repackage other components of the surface maintenance machine. Further, control algorithms according to exemplary embodiments of the present disclosure ensure that the amount of available resources (e.g., electrical power and cleaning fluid) is optimally used.

What is claimed is:

1. A pressure washer coupled to a mobile surface maintenance machine, the pressure washer comprising:
   a spray wand terminating in a nozzle to dispense a cleaning fluid therethrough;
   a pressure pump fluidly coupled to the spray wand and positioned upstream of the spray wand to supply the cleaning fluid to the spray wand;
   a feed pump positioned at the mobile surface maintenance machine, the feed pump being fluidly coupled to and located upstream of the pressure pump, the pressure pump receiving the cleaning fluid from the feed pump at a first pressure, and pressurizing the received cleaning fluid to a second pressure, the second pressure being greater than the first pressure;
   an electric motor operatively coupled to and configured to drive the pressure pump, the electric motor being configured to receive electric power from an electric power source positioned at the mobile surface maintenance machine; and
   a motor controller in operative communication with each of the electric motor and the pressure pump, the motor controller being operatively coupled with the pressure pump, the motor controller receiving signals indicative of one or more operating conditions of the surface maintenance machine and indicative of one or more operation conditions of the electric motor or the pressure pump,
   wherein the motor controller is configured to receive current from the electric power source and supply or stop supplying current to initiate or stop, respectively, operation of the electric motor based on the one or more operating conditions of the surface maintenance machine and the one or more operating conditions of the electric motor or the pressure pump, whereby the supplying of current to initiate operation of the electric motor to drive the pressure pump is configured to provide cleaning fluid to the spray wand at the second pressure, and
   wherein the motor controller is configured to stop supplying current to the electric motor when at least one or both of the following conditions is satisfied:

if the one or more operating conditions of the surface maintenance machine indicate that the surface maintenance machine is being propelled, and if the one or more operating conditions of the electric motor indicate that the electric motor is overheating.

2. The pressure washer of claim 1, wherein the pressure pump and the electric motor are each mounted on a common drive shaft, such that the pressure pump is directly coupled to the electric motor.

3. The pressure washer of claim 1, wherein the motor controller is configured to supply current to the electric motor when one or more of the following conditions are satisfied:

if onboard sensors indicate that the mobile surface maintenance machine has the cleaning fluid in a solution tank, if the pressure pump is receiving the cleaning fluid from the feed pump, and if the pressure pump is operational.

4. The pressure washer of claim 1, wherein the motor controller is configured to stop supplying current to the electric motor when one or more of the following conditions are satisfied:

if the solution tank is empty, and if the mobile surface maintenance machine has been stopped in an emergency.

5. The pressure washer of claim 1, wherein the electric power source comprises one or more batteries, and the motor controller is electrically coupled to the one or more batteries.

6. The pressure washer of claim 1, wherein the motor controller is housed at a housing, the housing configured to dissipate heat from surfaces of the motor controller, wherein the housing of the motor controller is in fluid communication with the feed pump and is positioned downstream thereof, such that the cleaning fluid from the feed pump passes through the housing of the motor controller, thereby cooling the motor controller.

7. The pressure washer of claim 1, wherein when it is determined that (i) the one or more operating conditions of the mobile surface maintenance machine indicate that the one or more operating conditions of the mobile surface maintenance machine are configured to permit operation of the pressure washer and (ii) the one or more operating conditions of the electric motor and/or the pressure pump indicate that the one or more operating conditions of the electric motor and/or the pressure pump are configured to permit operation of the pressure washer, the motor controller is configured to send the output signal to the electric motor.

8. A pressure washer coupled to a mobile surface maintenance machine, the pressure washer comprising:

a spray wand terminating in a nozzle to dispense a cleaning fluid therethrough;

a pressure pump fluidly coupled to the spray wand and positioned upstream of the spray wand to supply the cleaning fluid to the spray wand;

a feed pump positioned at the mobile surface maintenance machine, the feed pump being fluidly coupled to and located upstream of the pressure pump, the pressure pump receiving the cleaning fluid from the feed pump at a first pressure, and pressurizing the received cleaning fluid to a second pressure, the second pressure being greater than the first pressure;

an electric motor operatively coupled to and configured to drive the pressure pump, the electric motor being configured to receive electric power from an electric power source positioned at the mobile surface maintenance machine; and a motor controller in operative communication with each of the electric motor and the pressure pump, the motor controller being operatively coupled with the pressure pump, the motor controller receiving signals indicative of one or more operating conditions of the surface maintenance machine and indicative of one or more operation conditions of the electric motor or the pressure pump, wherein the motor controller is configured to receive current from the electric power source and supply or stop supplying current to initiate or stop, respectively, operation of the electric motor based on the one or more operating conditions of the surface maintenance machine and the one or more operating conditions of the electric motor or the pressure pump, whereby the supplying of current to initiate operation of the electric motor to drive the pressure pump is configured to provide cleaning fluid to the spray wand at the second pressure, wherein the motor controller is housed at a housing, the housing configured to dissipate heat from surfaces of the motor controller, wherein the housing of the motor controller is in fluid communication with the feed pump and is positioned downstream thereof, such that the cleaning fluid from the feed pump passes through the housing of the motor controller, thereby cooling the motor controller.

9. A pressure washer coupled to a mobile surface maintenance machine, the pressure washer comprising:

a spray wand terminating in a nozzle to dispense a cleaning fluid therethrough;

a pressure pump fluidly coupled to the spray wand and positioned upstream thereof to supply the cleaning fluid received from a fluid source from within the mobile surface maintenance machine to the spray wand;

an electric motor operatively coupled to the pressure pump and configured to drive the pressure pump, the electric motor being configured to receive electric power from an electric power source positioned within the mobile surface maintenance machine; and a motor controller in operative communication with each of the electric power source, the electric motor and the pressure pump, the motor controller being operatively coupled with the pressure pump, the motor controller being configured to:

receive signals from the mobile surface maintenance machine indicative of one or more operating conditions of the mobile surface maintenance machine, receive signals indicative of one or more operating conditions of the electric motor and the pressure pump respectively, determine whether the one or more operating conditions of the mobile surface maintenance machine indicate that the one or more operating conditions of the mobile surface maintenance machine are configured to permit operation of the pressure washer, determine whether one or more operating conditions of the electric motor and the pressure pump indicate that the one or more operating conditions of the electric motor and the pressure pump are configured to permit operation of the pressure washer, and when it is determined that (i) the one or more operating conditions of the mobile surface maintenance machine indicate that the one or more operating conditions of the mobile surface maintenance machine are configured to permit operation of the pressure washer and (ii) the one or more operating conditions of the electric motor and/or the pressure pump indicate that the one or more operating conditions of the electric motor and/or the pressure pump are configured to permit operation of the pressure washer, send an output signal to the electric motor, whereby, upon receipt of the output signal from the motor controller, the electric motor receives electric power from the electric power source and drives the pressure pump.

10. The pressure washer of claim 9,
wherein the fluid source is a solution tank, the pressure pump being fluidly coupled to the solution tank and a feed pump, each of the solution tank and the feed pump being positioned within the mobile surface maintenance machine, and
wherein the motor controller is operatively coupled to a pressure switch positioned upstream of the pressure pump, the motor controller being configured to receive a first electrical signal from the pressure switch indicative of fluid being received by the pressure pump from the fluid tank and via the feed pump.

11. The pressure washer of claim 10, wherein the motor controller is configured to send the output signal comprising a second electrical signal to the electric motor if the motor controller determines that the first electrical signal received from the pressure switch indicates that the fluid is received by pressure pump from the fluid tank via the feed pump, whereby, upon receipt of the second electrical signal, the electric motor receives electric power from the electric power source and drives the pressure pump.

12. The pressure washer of claim 10, wherein the motor controller is operatively coupled to a temperature sensor operatively coupled to the electric motor, the motor controller being configured to receive a third electrical signal from the temperature sensor indicative of the temperature of the electric motor to determine if the electric motor is overheating.

13. The pressure washer of claim 12, wherein the motor controller is configured to send the output signal comprising a fourth electrical signal to the electric motor if the motor controller determines that the first electrical signal received from the pressure switch indicates that the fluid is received by pressure pump from the solution tank via the feed pump, whereby, upon receipt of the fourth electrical signal, the electric motor stops receiving electric power from the electric power source and thereby stops driving the pressure pump.

14. The pressure washer of claim 9, wherein the motor controller is in operative communication with one or more onboard sensors of the mobile surface maintenance machine, to receive electrical signals indicative of one or more of the following:
whether the mobile surface maintenance machine is propelling,
if the fluid source is empty,
if the mobile surface maintenance machine has a pressure washer, and
if the mobile surface maintenance machine has been stopped in an emergency stop.

15. The pressure washer of claim 11, wherein the motor controller is configured to send a fifth electrical signal to the electric motor if the motor controller determines one or more of the following:
the pressure pump is receiving the cleaning fluid,
the motor temperature is less than preset temperature maximum, and
the pressure pump is operational.

16. The pressure washer of claim 9, wherein the motor controller is housed at a housing, the housing configured to dissipate heat from surfaces of the motor controller, wherein the housing of the motor controller is in fluid communication with the cleaning fluid such that the cleaning fluid passes through the housing of the motor controller, thereby cooling the motor controller.

17. The pressure washer of claim 9, wherein the motor controller is configured to stop supplying current to the electric motor when at least one or both of the following conditions is satisfied:
if the one or more operating conditions of the surface maintenance machine indicate that the surface maintenance machine is being propelled, and
if the one or more operating conditions of the electric motor indicate that the electric motor is overheating.

* * * * *